(12) United States Patent
Takahashi et al.

(10) Patent No.: US 7,229,598 B2
(45) Date of Patent: *Jun. 12, 2007

(54) DIFFUSION BONDED METALLIC CATALYST CARRIER AND PRODUCTION THEREOF

(75) Inventors: Yasuo Takahashi, Minoo (JP); Tadayuki Otani, Futtsu (JP); Kazutoshi Iwami, Tokyo (JP); Masayuki Kasuya, Tokai (JP)

(73) Assignee: Nippon Steel Corporation, Tokyo (JP)

( * ) Notice: Subject to any disclaimer, the term of this patent is extended or adjusted under 35 U.S.C. 154(b) by 27 days.

This patent is subject to a terminal disclaimer.

(21) Appl. No.: 10/830,885

(22) Filed: Apr. 23, 2004

(65) Prior Publication Data

US 2004/0258943 A1 Dec. 23, 2004

Related U.S. Application Data

(63) Continuation of application No. 09/423,944, filed as application No. PCT/JP99/01297 on Mar. 16, 1999, now Pat. No. 6,761,857.

(30) Foreign Application Priority Data

Mar. 16, 1998 (JP) .................................. 10-65088

(51) Int. Cl.
- B01D 53/34 (2006.01)
- B21D 39/00 (2006.01)
- B01J 21/04 (2006.01)
- B23K 26/00 (2006.01)

(52) U.S. Cl. ................. 422/180; 422/177; 422/211; 422/222; 502/439; 502/527; 428/593; 219/78.02; 219/121.64; 219/121.14; 219/121.63

(58) Field of Classification Search ............... 422/177, 422/180, 171, 211, 222; 428/593; 228/181
See application file for complete search history.

(56) References Cited

U.S. PATENT DOCUMENTS 4,752,599 A * 6/1988 Nakamura et al. ...... 502/527.22

(Continued)

FOREIGN PATENT DOCUMENTS

JP 08-038912 * 2/1996

*Primary Examiner*—Glenn Caldarola
*Assistant Examiner*—Kaity Handal
(74) *Attorney, Agent, or Firm*—Kenyon & Kenyon LLP

(57) ABSTRACT

A honeycomb body, which is composed in such a manner that a strip of corrugated foil made of heat-resistant stainless steel containing aluminum and a strip of flat foil made of stainless steel are alternately wound or laminated on each other, is incorporated into an outer cylinder made of metal and integrated into one body by means of diffusion bonding, so that a diffusion bonded metallic catalyst carrier can be formed. Surface roughness of the strip of foil after the completion of diffusion bonding is 0.001 to 2.0 µm when it is expressed by center line average height Ra, and no sintered bridges are formed at both end portions of the diffusion bonded section in the longitudinal direction. The catalyst carrier is manufactured in a condition so that $\lambda b$, which is defined by $$\lambda b = 6.8 \times 10^{-12} \times \delta f^{-1} \times F^{1/2} \times Ra^{-1/2} \times T^{1/4} \times \exp(15000/T) \times b^{1/2},$$

can be in a range from 8 to 20 where thickness of the strip of foil is $\delta f$ (m), average roughness of the foil surface is Ra (m), back tension in the case of winding is F (kgf), contact width of the piece of flat foil with the piece of corrugated foil is b (m), heat treatment temperature is T (K), and degree of vacuum is Pout (Pa), under the condition that $7.52 \times 10^9 \times \exp(-35000/T) \geq 8 \times \text{Pout}$.

8 Claims, 8 Drawing Sheets

U.S. PATENT DOCUMENTS 4,870,046 A * 9/1989 Yamanaka et al. .......... 502/439
6,689,328 B1 * 2/2004 Otani et al. ................. 422/180

6,761,857 B1 * 7/2004 Takahashi et al. .......... 422/180

* cited by examiner

DIFFUSION BONDED METALLIC CATALYST CARRIER AND PRODUCTION THEREOF

This application is a continuation application under 35 U.S.C. §120 of prior application Ser. No. 09/423,944 filed Feb. 22, 2000, now U.S. Pat. No. 6,761,857, which is a 35 U.S.C. §371 of PCT/JP99/01297 filed Mar. 16, 1999, wherein PCT/JP99/01297 was filed and published in the Japanese language. The entire disclosure of prior application Ser. No. 09/423,944, which is a 35 U.S.C. §371 of PCT/JP99/01297, is considered part of this continuation application and is hereby incorporated by reference.

FIELD OF THE INVENTION

The present invention relates to a diffusion bonded metallic catalyst carrier used for purifying exhaust gas discharged from an automobile engine. Also, the present invention relates to a method of manufacturing the diffusion bonded metallic catalyst carrier.

BACKGROUND OF THE INVENTION

Ceramic carrier have been conventionally used for catalytic converters used for purifying exhaust gas discharged from automobile engines. However, recently, the use of metallic catalyst carrier is increasing because the resistance to heat of the catalyst carrier is high and, further, the pressure loss caused by the catalyst carrier is low and furthermore catalytic converters into which the catalyst carrier are incorporated can be easily mounted on automobiles.

As shown in FIG. 1, a conventional catalyst carrier 1 is manufactured in such a manner that a metallic honeycomb body 2 composed of heat-resistant stainless steel foil containing aluminum is incorporated into an outer cylinder 3 made of metal. As shown in FIG. 2, the metallic honeycomb body 2 is manufactured in such a manner that a piece of strip-like flat foil 5, the thickness of which is approximately 50 μm, and a piece of strip-like corrugated foil 6, which is made by corrugating a piece of strip-like flat foil 5, are put on each other and spirally wound round a winding shaft 8 in the direction of arrow B. On the piece of strip-like corrugated foil 6, a ridge 7 is formed at each wave in the width direction. In the columnar metallic honeycomb body 2 in which the piece of corrugated foil is spirally wound, a large number of vent holes 4 are formed in the axial direction of the columnar body. Catalyst carried is supported in these vent holes 4. In this way, the catalytic converter is composed.

High durability is required of the catalytic converter because it must stand the severe heat cycle given off by the exhaust gas at a high temperature discharged from an engine and further it must stand the intense vibration from the engine. Therefore, in the conventional catalyst carrier 1, the flat foil 5 and the corrugated foil 6 of the metallic honeycomb body 2 are joined to each other at the contact section, and further an outer circumference of the metallic honeycomb body 2 and an inner circumference of the outer cylinder 3 are joined to each other.

Concerning the joining means, there are provided various means such as soldering, diffusion bonding, resistance welding, laser welding and so forth. Diffusion bonding is advantageous because no solder is required and further no specific welding jig is required and, furthermore, diffusion bonding can be appropriately used for mass production.

In general, when diffusion bonding is conducted, members to be joined to each other are made to come close to each other and are heated to high temperature in a high vacuum. In diffusion bonding of the metallic honeycomb body 2 in which pieces of foil are spirally wound, it is impossible to apply surface pressure to the metallic honeycomb body 2 from the outside. Therefore, when back tension is given to the flat foil 5 in the direction of arrow A in the process of winding as shown in FIG. 2, surface pressure can be given, so that the flat foil 5 and the corrugated foil 6 can be made to come close to each other. When the thus formed metallic honeycomb body 2 is heated to high temperature in a high vacuum, the flat foil 5 and the corrugated foil 6 are subjected to diffusion bonding, so that the catalyst carrier 1 can be obtained.

FIG. 3 is a diagram showing temperature curves of the pressures of saturated vapors of iron, chromium and aluminum composing this stainless steel. The pressure of saturated vapor is defined as a value at which the pressure of vapor of a liquid (solid) becomes constant in a vapor phase space when the vapor phase and the liquid phase (solid phase) of the same substance coexist in an equilibrium state. The value of the pressure of a saturated vapor is different for each substance. This value is increased when the temperature is raised. Therefore, when a temperature curve of pressure of saturated vapor is located in an upper portion on the diagram, vaporization tends to occur. Accordingly, aluminum is most vaporized in the materials composing this stainless steel. Due to the foregoing, when the metallic honeycomb body 2 is heated to high temperature in a high vacuum, aluminum is mainly vaporized from stainless steel foil containing aluminum. For the above reasons, when the metallic honeycomb body 2 is heated to high temperature in a high vacuum so as to conduct diffusion bonding on the metallic honeycomb body 2, aluminum is vaporized from the metallic honeycomb body 2, and resistance to oxidation is deteriorated.

However, as shown in FIG. 3, a section of diffusion bonding is not formed in a temperature range of not higher than 1400 K, and a section of diffusion bonding is formed in a temperature range of not lower than 1400 K. This shows that it is necessary for aluminum, the quantity of which is not lower than a predetermined value, to be vaporized in order to form a section of diffusion bonding.

Due to the foregoing, the following are required in order to obtain a metallic honeycomb body of high quality.

(1) Aluminum, the quantity of which is not less than a predetermined value for obtaining a section of diffusion bonding, is vaporized.

(2) Vaporization of aluminum is suppressed to a value not more than a predetermined value so that resistance to oxidation is impaired, that is, it is necessary to control vaporization of aluminum in the process of diffusion bonding.

As a method of controlling vaporization of aluminum in the process of diffusion bonding of the metallic honeycomb body 2, Japanese Unexamined Patent Publication No. 9-215930 discloses the following means. According to the above method, the metallic honeycomb body 2 is covered with a cover having holes and subjected to diffusion bonding. Due to the foregoing, residual oxygen is discharged outside from the holes, and generated aluminum vapor is made to stay close to the metallic honeycomb body 2. According to the above proposal, vaporization of aluminum can be surely suppressed, however, it is necessary to attach the covers to all honeycomb bodies 2, which remarkably deteriorates the productivity. According to this proposal, heat treatment of diffusion bonding is conducted at 1300° C. in a vacuum. When heat treatment is conducted at such a high temperature in a vacuum, aluminum is intensely vaporized, and diffusion bonding cannot be sufficiently done. Therefore, in order to ensure resistance to heat, it is necessary to provide another means instead of the cover described above.

In the same manner, Japanese Unexamined Patent Publication No. 5-168945 discloses another means for controlling vaporization of aluminum in the process of diffusion bonding of the metallic honeycomb body 2. According to this method, a cover is set on the metallic honeycomb body 2, and a clearance is provided between the cover and the outer cylinder. Under the above condition, diffusion bonding is conducted. Due to the foregoing, residual oxygen is discharged outside from the clearance, so that generated aluminum vapor is made to stay close to the metallic honeycomb body 2. According to the above proposal, vaporization of aluminum can be surely suppressed, however, it is necessary to attach the covers to all honeycomb bodies 2, which remarkably deteriorates the productivity.

The applicant filed a patent, by Japanese Unexamined Patent Publication No. 8-38912, in which the following method is proposed. The average roughness (Ra) of a surface of the flat foil and that of a surface of the corrugated foil before diffusion bonding are kept to be not less than 0.001 µm and not more than 0.2 µm, and further the contact width of the flat foil with the corrugated foil is kept to be not less than 30 µm. Due to the foregoing, diffusion bonding can be excellently conducted in all regions of the honeycomb body from the center to the outer circumferential section by giving a back tension, the intensity of which is not higher than a value at which buckling is caused in the vent hole of the honeycomb body, and also by reducing the diameter of the outer cylinder. Also, the applicant filed Japanese Unexamined Patent Publication No. 10-309472 in which the following method is proposed. The contact width of the flat foil with the corrugated foil is kept at a value not less than 5 times of the thickness t of the flat foil and the corrugated foil. The flat foil and the corrugated foil are wound while a back tension, the intensity of which is 0.2 to 1.5 kgf/cm, is being given to the honeycomb body, and diffusion bonding is conducted in a temperature range from 1100 to 1250° C., and it is preferable that diffusion bonding is conducted in a temperature range of vacuum heat treatment corresponding to the average roughness Rac (µm) in the width direction of the plane foil.

SUMMARY OF THE INVENTION

It is an object of the present invention to provide a diffusion bonded metallic catalyst carrier of a catalytic converter used for purifying exhaust gas discharged from an automobile engine. It is another object of the present invention to provide a method of manufacturing the diffusion bonded metallic catalyst carrier of the catalytic converter. According to the present invention, when a metallic honeycomb body made of heat-resistant stainless steel containing aluminum is subjected to diffusion bonding, a quantity of vaporization of aluminum is minimized while a necessary mechanical strength of diffusion bonding is ensured. Due to the foregoing, it is possible to provide diffusion bonded metallic catalyst carrier, the resistance to oxidation and the durability of which are high. Also, it is possible to provide a method of manufacturing the diffusion bonded metallic catalyst carrier. A summary of the present invention is described below.

(1) A diffusion bonded metallic catalyst carrier comprising: a honeycomb body composed of a piece of corrugated foil made of heat-resistant stainless steel containing aluminum and a piece of flat foil or corrugated foil made of stainless steel, the piece of corrugated foil and the piece of flat foil or corrugated foil being alternately wound or laminated on each other; and an outer cylinder made of metal into which the honeycomb body is incorporated, the honeycomb body and the outer cylinder being integrated into one body by means of diffusion bonding, wherein the surface roughness of the pieces of foil after diffusion bonding is kept so that the center line average height Ra can be 0.001 to 2.0 µm, and no sintered bridges are formed at both end portions of the bond sections of the two pieces of foil of the flat foil and the flat foil or corrugated foil in the longitudinal direction of the pieces of foil.

(2) A diffusion bonded metallic catalyst carrier according to item (1), wherein the surface roughness of the pieces of foil in the foil width direction after diffusion bonding is kept so that the center line average height Ra can be 0.001 to 2.0 µm.

(3) A diffusion bonded metallic catalyst carrier according to item (1) or (2), wherein solder bonding is conducted on a contact section of the piece of flat foil with the piece of corrugated foil on the entry side of exhaust gas and diffusion bonding is conducted on the delivery side of exhaust gas.

(4) A diffusion bonded metallic catalyst carrier according to one of items (1) to (3), wherein the corrugated-form of the piece of corrugated foil on the entry side of exhaust gas of the catalyst carrier is formed into a trapezoid in which an area of the contact section of the piece of flat foil with the piece of corrugated foil is large, and the corrugated-form of the piece of corrugated foil on the delivery side of exhaust gas of the catalyst carrier is formed into a configuration in which an area of the contact section of the piece of flat foil with the piece of corrugated foil is not large.

(5) A diffusion bonded metallic catalyst carrier according to one of items (1) to (4), wherein the thickness of the piece of flat foil is not uniform, so that the thickness of the piece of flat foil on the entry side of exhaust gas of the metallic support is large, and the thickness of the piece of flat foil on the delivery side of exhaust gas of the catalyst carrier is small.

(6) A method of manufacturing a diffusion bonded metallic catalyst carrier, the diffusion bonded metallic catalyst carrier comprising: a honeycomb body composed of a piece of corrugated foil made of heat-resistant stainless steel containing aluminum and a piece of flat foil or corrugated foil made of stainless steel, the piece of corrugated foil and the piece of flat foil or corrugated foil being alternately wound or laminated on each other; and an outer cylinder made of metal into which the honeycomb body is incorporated, the honeycomb body and the outer cylinder being integrated into one body by means of diffusion bonding, the method of manufacturing the diffusion bonded metallic catalyst carrier comprising the step of selecting parameters so that λb, which is defined by $$\lambda b = C \times \delta f^{-1} \times F^{1/2} \times Ra^{-1/2} \times T^{1/4} \times \exp(15000/T) \times b^{1/2}$$

under the condition where $7.52 \times 10^9 \times \exp(-35000/T) \geq 8$ Pout is satisfied, can be in a range from 8 to 20 where thickness of the strip of foil is δf (m), center line average height of the foil surface before diffusion bonding is Ra (m), back tension in the case of winding is F (kgf), contact width of the piece of flat foil with the piece of corrugated foil or contact width of the piece of a first corrugated foil with the piece of a second corrugated foil is b (m), heat treatment temperature is T (K), degree of vacuum is Pout (Pa), and the constant of proportion is C.

(7) A method of manufacturing a diffusion bonded metallic catalyst carrier according to item (6), wherein surface roughness Rac (m) of the strip of foil in the foil width direction is used for the center line average height Ra (m).

(8) A method of manufacturing a diffusion bonded metallic catalyst carrier according to item (6) or (7), wherein a strip of foil is used, the surface roughness of which is 0.001 to 0.30 μm when it is expressed by the center line average height Ra.

(9) A method of manufacturing a diffusion bonded metallic catalyst carrier according to item (6) or (7), wherein a strip of foil is used, the surface roughness in the foil width direction of which is 0.001 to 0.30 μm when it is expressed by the center line average height Ra.

(10) A method of manufacturing a diffusion bonded metallic catalyst carrier according to one of items (6) to (9), wherein the parameters are selected so that λb can be in a range from 14 to 18.

(11) A method of manufacturing a diffusion bonded metallic catalyst carrier according to one of items (6) to (9), wherein the constant of proportion is $C=6.8\times10^{-12}$.

BRIEF DESCRIPTION OF THE DRAWINGS

FIG. 5(a) is a view showing a metallic honeycomb body of the present invention, and FIG. 5(b) is a view showing a conventional metallic honeycomb body.

FIG. 7(a) is a view showing an example of the present invention, and FIG. 7(b) is a view showing another example of the present invention.

THE MOST PREFERRED EMBODIMENT

Figure 4:
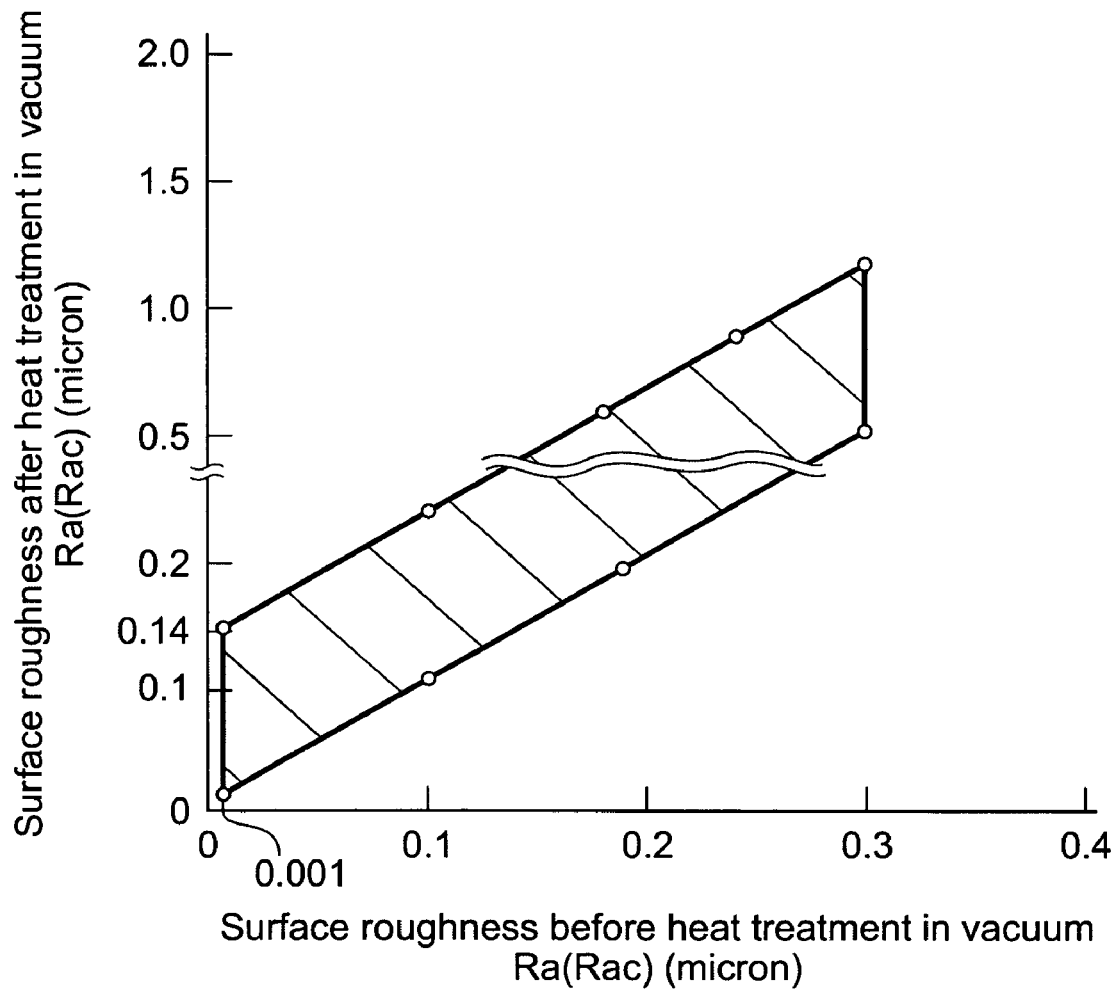
FIG. 4 is a diagram showing a change in surface roughness of pieces of flat foil and corrugated foil before and after heat treatment is conducted in a vacuum.

First, a diffusion bonded metallic catalyst carrier of the present invention is characterized in that: because of diffusion bonding, the surface roughness of pieces of flat foil and corrugated foil is 0.001 to 2.0 μm after heat treatment in a vacuum when it is expressed by the center line average height Ra, and it is preferable that surface roughness of pieces of flat foil and corrugated foil is 0.2 to 1.0 μm after heat treatment in a vacuum when it is expressed by the center line average height Ra. When surface roughness before heat treatment in a vacuum for diffusion bonding of stainless steel used for material of a diffusion bonded metallic catalyst carrier of the present invention is smooth or a little rough so that the center line average height Ra is 0.001 to 0.30 μm, the mechanical strength of diffusion bonding can be more enhanced. This can be seen from the following. As shown in FIG. 4, the surface roughness of a portion of material in which no junction is made is increased after heat treatment in a vacuum. For example, the following were found in an experiment made by the present applicant. When material, the surface roughness of which was 0.001 μm, was heat-treated in a vacuum for 90 minutes at 1250° C., its surface roughness was increased to Ra 0.14 μm.

In the case where the center line average height is not more than 0.001 μm, a swell is caused in the piece of foil and it becomes difficult for alumina to adhere to the piece of foil. On the other hand, in the case where the center line average height is not less than 2.0 μm, the thickness of wash-coat ($Al_2O_3$) becomes not uniform.

Figure 5A:
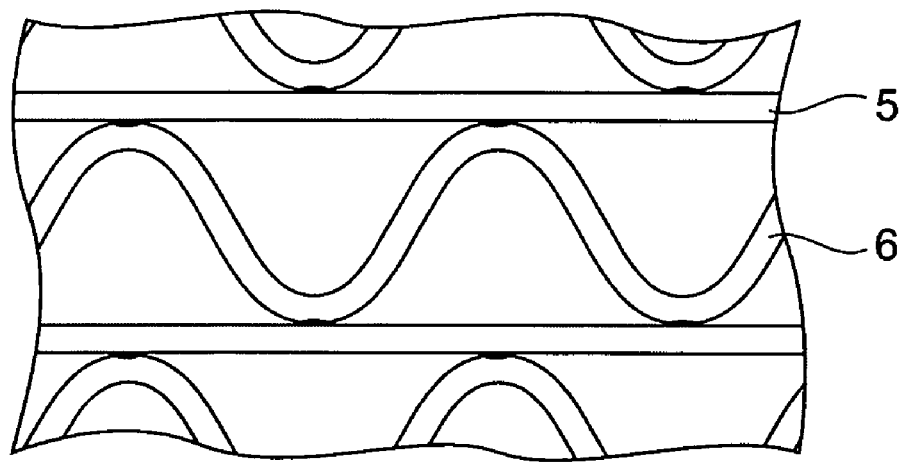
FIGS. 5(a) and 5(b) are partial enlarged views of a metallic honeycomb body.
Figure 5B:
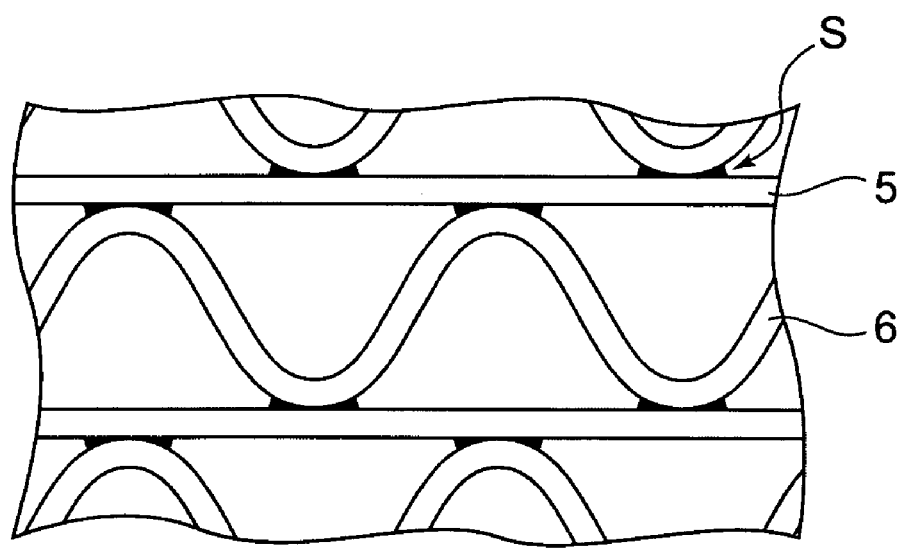

Next, the diffusion bonded metallic catalyst carrier of the present invention is also characterized in that: no sintered bridges are formed at both end portions of the bond of two pieces of foil of the corrugated foil and the flat foil in the longitudinal direction of the piece of foil of a product obtained by means of diffusion bonding conducted by heat treatment in a vacuum. Usually, when a catalyst carrier made of stainless steel containing aluminum is subjected to heat treatment in a vacuum at high temperature of not lower than 1300° C., sintered bridges are formed at the bonding. When these sintered bridges are formed, the following problems may be encountered. When the catalyst carrier is used in a converter for exhaust gas, and vibration is given to the catalyst carrier at high temperature at all times, aluminum is vaporized from these sintered bridges, so that a quantity of aluminum contained in stainless steel is reduced. Therefore, the catalyst carrier becomes fragile. As a result, sintered bridges S shown in FIG. 5(b) are generated, and cracks are caused in these sintered bridges. Accordingly, the cracked portions are corroded at high temperature, and the diffusion bonded joints are damaged. Consequently, it is necessary that no sintered bridges are formed in the peripheries of the diffusion bonded portions in the diffusion bonded metallic catalyst carrier of the present invention.

Next, when the diffusion bonded metallic catalyst carrier is manufactured, the primary manufacturing particulars are foil thickness, surface roughness of foil, configuration of corrugated foil, temperature of heat treatment and degree of vacuum. Since a relation of relative dependency of these manufacturing particulars is unknown and a general solution has not been found until now, a particular solution is found according to data obtained by an experiment. In the diffusion bonded metallic catalyst carrier, (1) the mechanical strength of a diffusion bonded joints and (2) the resistance to oxidation must be compatible with each other. However, these two factors depend upon a phenomenon of vaporization of aluminum. Therefore, it is impossible to control these two factors by the conventional technique, that is, it is difficult to make these two factors (1) and (2) compatible with each other.

First, the reason why vaporization of aluminum is required for guaranteeing the mechanical strength of a diffusion bonded joint will be described below. The present applicant made experiments and confirmed that a strong oxide film was formed on a surface of heat-resistant stainless steel containing aluminum by residual oxygen in a furnace in the process of heat treatment in a vacuum. As long as this oxide film exists, the diffusion bonding cannot proceed. However, when aluminum is vaporized below this oxide film, the oxide film comes off like scales and coagulates. After the oxide film has come off, fresh surfaces of base metal come into contact with each other, and the diffusion bonding can proceed. In other words, it was found that vaporization of aluminum is essential in order to remove the oxide film. It was also found that vapor of aluminum covers a surface of metal after the oxide film has come off and that the vapor of aluminum is combined with residual oxygen so that oxidation can be prevented.

However, there is an upper limit of a quantity of aluminum to be vaporized, that is, when an excessively large quantity of aluminum is vaporized, the quantity of remaining aluminum is reduced. Accordingly, the resistance to oxidation of the base metal is remarkably impaired. Consequently, the quantity of aluminum to be vaporized is limited. The most powerful parameter to control the vaporization of aluminum is temperature T of heat treatment, and the next powerful parameter to control the vaporization of aluminum is degree of vacuum Pout.

As described before, when heat treatment in a vacuum is conducted at a high temperature of not lower than 1300° C. in a vacuum of $10^{-2}$ Pa, the vaporization of aluminum does not occurred. For example, when the temperature is decreased to 1200° C., the quantity of vaporized aluminum is considerably decreased. If it is possible to conduct diffusion bonding in this temperature range, it is unnecessary to use the cover described in Japanese Unexamined Patent Publication Nos. 5-168945 and 9-215930, and the productivity is not impaired.

In order to make (1) the mechanical strength of the diffusion bonded joint and (2) the resistance to oxidation compatible with each other, the inventors made investigation into an interaction between the manufacturing, condition of catalyst carrier of diffusion bonding and aluminum. As a result of the investigation, in order to express a state of vaporization of aluminum, the following λb, which is a dimensionless number, was newly introduced, wherein b is the contact width of the pieces of flat foil and corrugated foil in meters (m).

$$\lambda b = \sqrt{\{(2kT \times K_1 \times \sqrt{(1/T)})/(\delta_g \times D_0 \times \exp(-Q_p/RT))\}} \times b \quad (1)$$

However, the inventors made experiments and found that the following relation can be established between pressure of saturated vapor Ps of aluminum and degree of vacuum Pout.

$$Ps = K_2 \times \exp(-Q/RT) \geq 8 \times Pout \quad (2)$$

Each constant can be expressed as follows.

$K_1 = 6.69 \times 10^{24}$ (s$^{-1}$Pa$^{-1}$ m$^{-2}$K$^{-1/2}$)

$K_2 = 7.52 \times 10^9$ (Pa)

$Q = 291.0$ (kJ·mol$^{-1}$)

$Q_p = 250$ (kJ·mol$^{-1}$)

$D_0 = 1.905 \times 10^{11}$ (m$^2$s$^{-1}$)

$R = 8.31$ J·K$^{-1}$mol$^{-1}$ $k = 1.38 \times 10^{-23}$ (J·K$^{-1}$)

The average gap $\delta_g$ between the pieces of flat foil and corrugated foil is in proportion to moment of inertia of area of the piece of foil and also in proportion to average roughness of a surface of the piece of foil. Further, the average gap $\delta_g$ between the pieces of flat foil and corrugated foil is in inverse proportion to surface pressure. Therefore, it can be expressed by the following expression.

$$\delta_g = f(\delta f^2, F/b, Ra) \quad (3)$$

As a result of the experiments made by the inventors, it was found that the above expression (3) can be approximated by the following expression.

$$\delta_g = C_1 \times \delta f^2 \times 1/(F/b) \times Ra \quad (4)$$

In this case, $C_1$ is a proportional constant, δf (m) is foil thickness, Ra (m) is average roughness of the surface of foil, F (kgf) is back tension in the case of winding the pieces of foil, and b (m) is contact width of the pieces of flat foil and corrugated foil.

The following expression can be obtained from the above constants and expressions (1) and (4).

$$\lambda b = C \times \delta f^{-1} \times F^{1/2} \times Ra^{-1/2} \times T^{1/4} \times \exp(15000/T) \times b^{1/2} \quad (5)$$

In the above expression, C is a proportional constant.

When the constant is substituted into the expression (2), the following expression can be obtained.

$$7.52 \times 10^9 \times \exp(-35000/T) \geq 8 \times Pout \quad (6)$$

In this connection, in the above expressions (3) to (5), it is more preferable to use Rac (average roughness in the width direction) instead of Ra.

In this connection, several methods of measuring parameters will be explained as follows.

A geometrical configuration of a piece of foil has a great influence on the diffusion bonding. This geometrical configuration of a piece of foil could be represented by average roughness Ra of the piece of foil. This Ra is based on the arithmetic means stipulated by JIS B0601-1994, and the measurement of Ra was made by a tracer method type roughness measuring device stipulated by JIS B0651-1976.

In this connection, in order to take measurements precisely while an influence caused by deformation of a piece of foil is eliminated, a sample to be measured was made to come into close contact with a surface plate. In the measurement, a tracer needle was used, the radius of curvature of the tip of which was 1 μm, and the measurement was made under the condition that the cut-off value was 0.8 mm, the scanning speed of the tracer needle was 0.3 mm/sec, and the gauge length was 4 mm.

Figure 6:
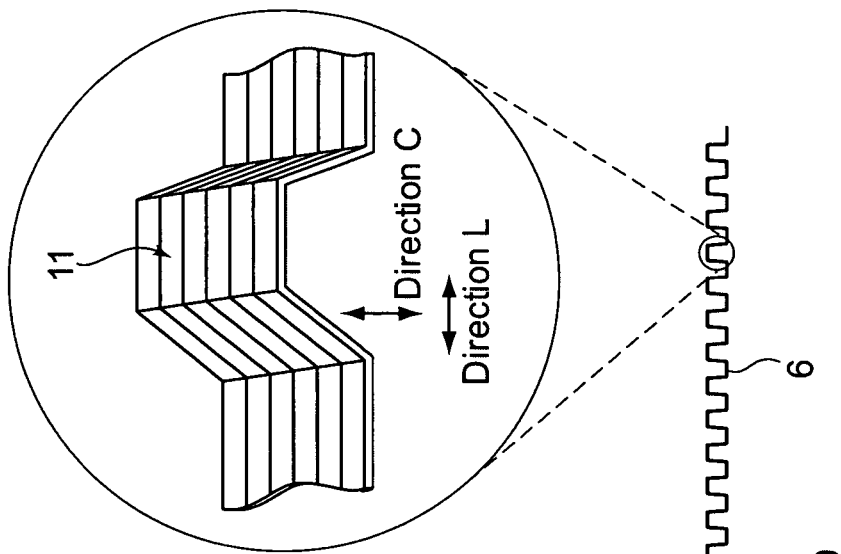
FIG. 6 is a schematic illustration showing circumstances in which a piece of flat foil is corrugated.
Figure 6:
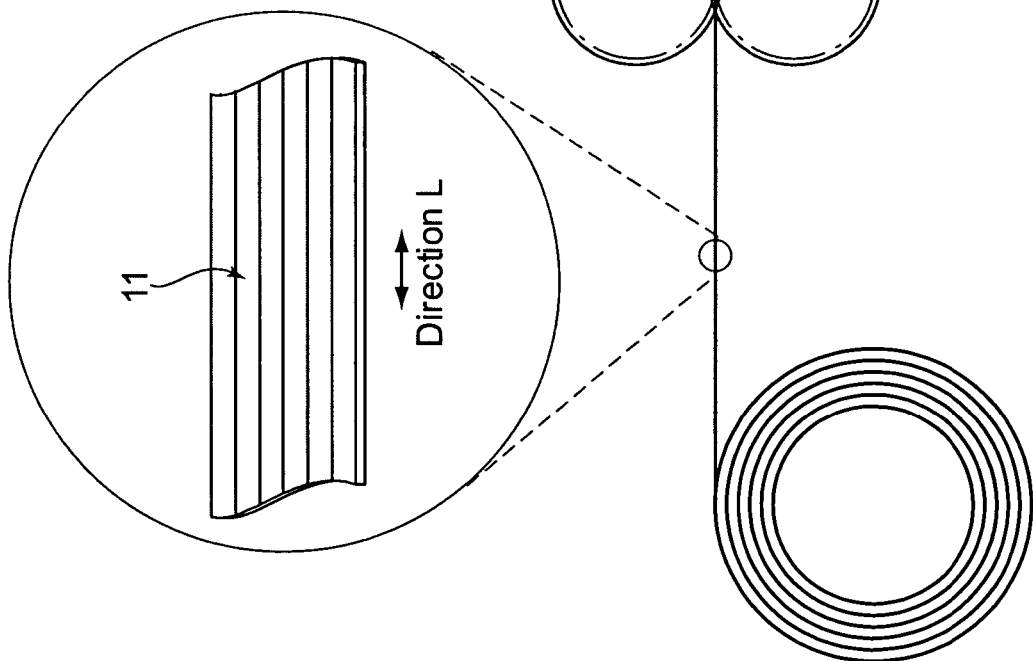

Surface configurations of some pieces of foil made of stainless steel have an orientation. For example, when a piece of foil is rolled by a pair of finishing rollers having flaws in the circumferential direction, these flaws are transferred onto a surface of the piece of foil. Therefore, flaws are caused on the piece of foil in the longitudinal direction. When a piece of corrugated foil is made from the above piece of foil having flaws when it is made to pass through a pair of corrugating gears 9 as shown in FIG. 6, stripe-shaped flaws 11 are caused in the longitudinal direction in the protrusions of the piece of foil 6 to be bonded.

When the contact portions of the pieces of flat foil 5 and corrugated foil 6 are subjected to diffusion bonding, it is necessary to fill the flaws in the foil width direction by means of surface diffusion. Accordingly, when the flaws are caused on the piece of foil in the longitudinal direction by the finishing rollers in the process of rolling, average roughness Rac in the foil width direction, which is one of the geometrical configurations of the piece of foil, controls a phenomenon of diffusion bonding. Of course, the tracer needle conducts scanning in the foil width direction (direction C in FIG. 6), so that the average roughness is measured.

Concerning contact width b of the piece of flat foil with the piece of corrugated foil, after the pieces of flat foil and the corrugated foil were alternately wound, they were inserted into an outer cylinder, and contact width b of the piece of flat foil with the piece of corrugated foil was measured by a microscope before conducting heat treatment in a vacuum.

Table 1 shows a relation between λb and the result of a thermal durability test of an engine conducted on the metallic honeycomb body. In this test, the temperature of the exhaust gas discharged from the engine was 950° C., and one cycle was determined in such a manner that ON was kept for 10 minutes and then OFF was kept for 10 minutes. In this case, when λb is calculated, a proportional constant $C=6.8\times10^{-12}$ was adopted.

TABLE 1

Relation between λb and result of thermal durability test of engine

| λb | Result of thermal durability test of engine (cycle) | Success or failure | |
|---|---|---|---|
| | | 900 cycles | 1800 cycles |
| 4 | 454 | Failure | Failure |
| 6 | 720 | Failure | Failure |
| 8 | 1022 | Success | Failure |
| 10 | 1200 | Success | Failure |
| 12 | 1560 | Success | Failure |
| 14 | 2000 | Success | Success |
| 16 | 2000 | Success | Success |
| 18 | 2000 | Success | Success |
| 20 | 1130 | Success | Failure |
| 22 | 780 | Failure | Failure |
| 24 | 561 | Failure | Failure |

According to the result of the above experiment, the following can be understood. When λb is not less than 8 and not more than 20, it is possible to make the bond strength of the metallic honeycomb body and the resistance to oxidation compatible with each other, and also it is possible to succeed in passing the thermal durability test of 900 cycles in which an actual automobile engine is used. Further, when λb is not less than 14 and not more than 18, it was possible to succeed in passing the thermal durability test of 1800 cycles.

A honeycomb body, in which a piece of flat foil made of stainless steel containing aluminum and a piece of corrugated foil obtained by corrugating the piece of flat foil are alternately wound, is incorporated into an outer cylinder made of metal, and then the honeycomb body is integrated into one body by diffusion bonding. In diffusion bonded metallic catalyst carrier, manufacturing is conducted under the condition that λb is not less than 8 and not more than 20, wherein λb is defined by the following expression.

$$\lambda b = 6.8\times10^{-12}\times\delta f^{-1}\times F^{1/2}\times Ra^{-1/2}\times T^{1/4}\times\exp(15000/T)\times b^{1/2}$$

In this case, the condition of $7.52\times10^9\times\exp(-35000/T) \geq 8\times Pout$ is satisfied where δf (m) is foil thickness, Ra (m) is average roughness of a surface of foil, F (kgf) is back tension given in the process of winding, b(m) is contact width of a piece of flat foil with a piece of corrugated foil, T(K) is temperature of heat treatment, and Pout (Pa) is degree of vacuum. Due to the foregoing, When a quantity of aluminum to be vaporized necessary for diffusion bonding is ensured, it is possible to guarantee the bond strength of diffusion bonding, and further when a quantity of aluminum to be vaporized is made a minimum, the resistance to oxidation can be maximized. In this way, it is possible to obtain a diffusion bonded metallic catalyst carrier of high quality in which the bond strength of diffusion bonding is guaranteed and the resistance to oxidation can be maximized.

When exhaust gas is discharged from an engine in the form of a drift current, the catalyst reaction on the exhaust gas entry side of the catalyst carrier and that on the exhaust gas delivery side are different from each other. In the present invention, the designing of the catalyst carrier was studied while consideration was given to this difference of catalyst reaction.

Figure 9:
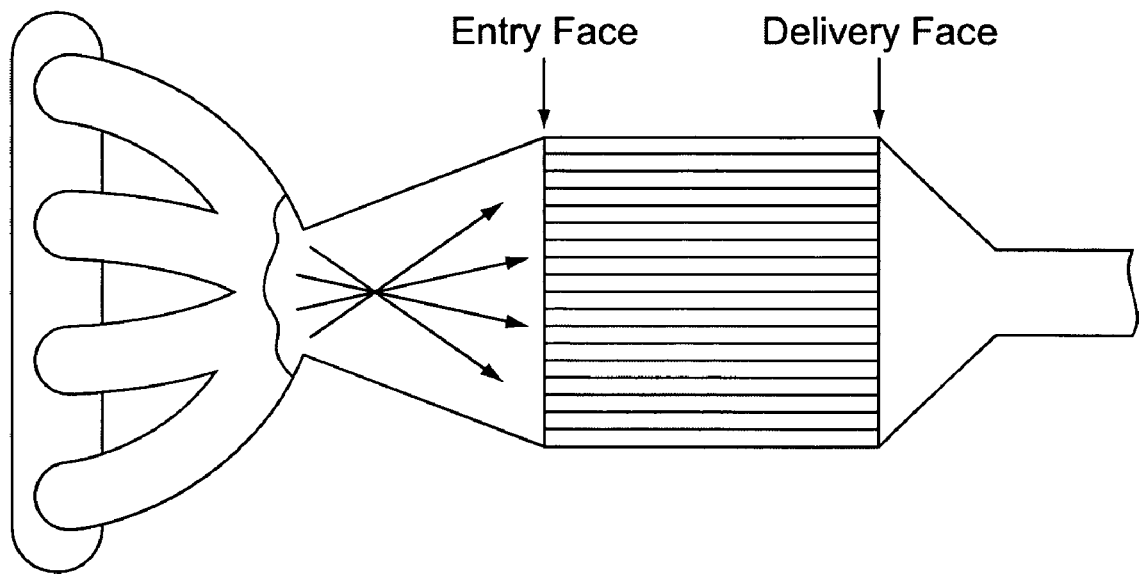
FIG. 9 is a plan view (partial cross-sectional view) showing a catalyst carrier and an exhaust manifold.
Figure 10:
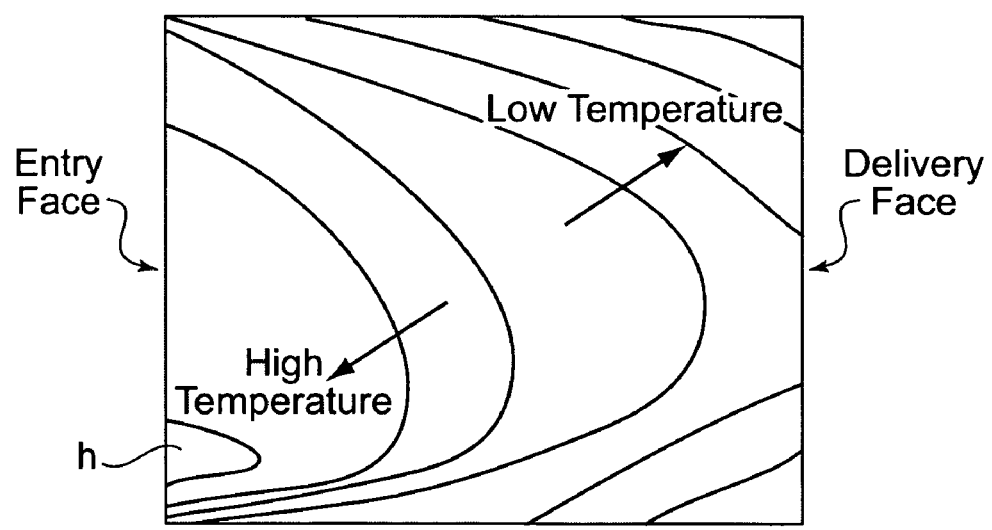
FIG. 10 is a view showing a temperature distribution in a catalyst carrier.

Although it is not desirable, a drift current, in which a flow velocity of gas is partially increased, exists on the exhaust gas entry side of the catalyst carrier in some cases. In this case, in a portion of the catalyst carrier into which the drift current flows, the catalyst reaction proceeds. Therefore, a large amount of combustion heat is generated and the temperature is raised higher than other portions, that is, the temperature distribution becomes non-uniform. FIG. 10 is a view showing a temperature distribution in the catalyst carrier at one moment. Because of a drift current generated on the exhaust gas entry side, there is formed a portion h, the temperature of which is high. For example, as shown in FIG. 9, a current of exhaust gas discharged from each cylinder is periodically changed according to the rotation of an engine, and a portion in which the drift current is formed is moved according to the above change. Therefore, temperature of the drift current portion of the catalyst carrier is suddenly raised and lowered. This rapid heating and cooling are repeated. In the portion h, the temperature of which is locally raised, the honeycomb body is thermally expanded. Therefore, thermal stress is generated between the portion h and other peripheral portions. In the diffusion bonded metallic catalyst carrier, flexibility of a piece of foil between the bond sections is high, especially flexibility of a piece of flat foil between the bond sections is high. Therefore, the thermal stress caused in the drift current portion can be released by local deformation of the piece of flat foil. However, as a result, the piece of flat foil close to the drift current portion is repeatedly given a great deformation. Therefore, this deformed portion is subjected to fatigue failure, which is a cause of breakdown of the diffusion bonded metallic catalyst carrier on the exhaust gas entry side when the catalyst carrier is arranged right after the exhaust manifold. On the other hand, in the case of a catalyst carrier in which bonding is made by soldering, rigidity of a piece of foil is high, especially rigidity of a piece of flat foil is high because of the soldered portion in the catalyst carrier. Therefore, thermal stress of the drift current portion is not released only by the peripheral portion of the drift current portion, that is, the thermal stress of the drift current portion is released by a wide range including the drift current portion. Accordingly, there is no possibility that the drift current portion is given a locally intense deformation, and fatigue failure is not caused.

Concerning the combustion caused by the catalyst reaction in the catalyst carrier, the combustion is most intensely conducted in a portion right after an entrance of the catalyst carrier from which exhaust gas is fed, and a quantity of combustion heat is decreased in a portion located on the downstream side of the exhaust gas flow. On the other hand, heat is emitted outside via a metallic portion composing the catalyst carrier. Therefore, as shown in FIG. 10, the temperature on the exhaust gas delivery side of the catalyst carrier becomes lower than the temperature on the exhaust gas entry side. Accordingly, a difference in temperature between the drift current portion and the periphery portion of the drift current portion is reduced as it comes to the exhaust gas delivery side of the catalyst carrier. Therefore, the temperature of the drift current portion is not locally raised.

Figure 7A:
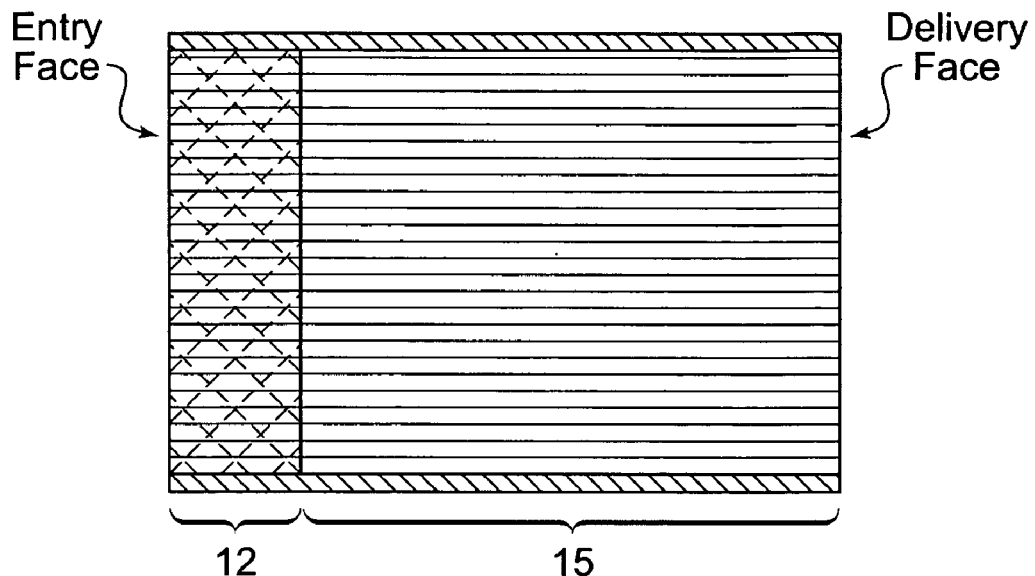
FIGS. 7(a) and 7(b) are cross-sectional views showing a catalyst carrier of the present invention.

In the present invention, as shown in FIG. 7(a), it is preferable that the length of the soldered portion 12 in the longitudinal direction of the catalyst carrier is 5% to 50% of the diameter of the catalyst carrier from the exhaust gas entry face shown in FIG. 10. It is more preferable that the length of the soldered portion 12 is 10% to 30%. Concerning portions to be soldered, it is preferable that all portions are soldered in the diameter direction of the catalyst carrier. The length of the soldered portion is determined to be not less than 5% of the diameter of the catalyst carrier, and it is preferable that the length of the soldered portion is determined to be not less than 10% of the diameter of the catalyst carrier. The reason is that the rigidity of the honeycomb body in the radial direction is increased so that the honeycomb body can resist thermal stress in the radial direction generated in the drift current portion on the entry side of exhaust gas. The length of the soldered portion is determined to be not more than 50% of the diameter of the catalyst carrier, and it is preferable that the length of the soldered portion is determined to be not more than 30% of the diameter of the catalyst carrier. The reason is that the honeycomb body is given flexibility in the axial direction so that thermal stress in the axial direction generated on the entry side of exhaust gas can be released to the delivery side of the exhaust gas.

Figure 7B:
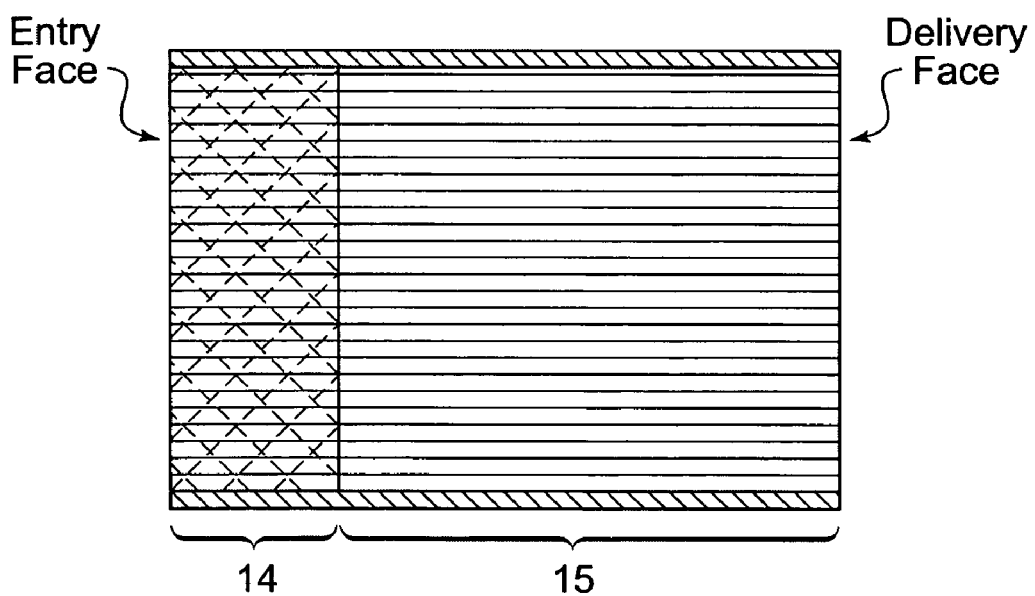
Figure 8:
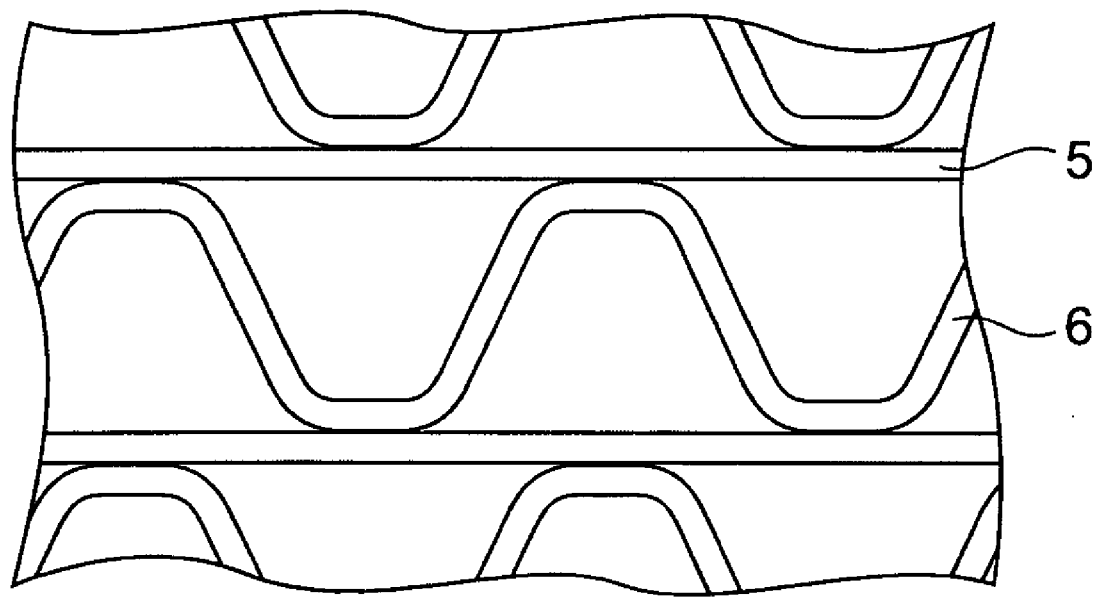
FIG. 8 is a view showing the detail of a configuration of a piece of foil composing a catalyst carrier of the present invention.

In the present invention, a corrugate-form of the piece of corrugated foil on the entry side of exhaust gas is determined to be a trapezoid as shown in FIG. 8. It is preferable that width W of the contact section of the piece of flat foil with the piece of corrugated foil in the circumferential direction of the catalyst carrier of a portion, in which the piece of flat foil is contacted with the piece of corrugated foil and bonded by diffusion bonding, is determined to be not less than 5 times as large as thickness T of the piece of flat foil. The reason is described as follows. When width W of the contact section of the piece of flat foil with the piece of corrugated foil is smaller than 5 times of thickness T of the piece of flat foil, it is impossible to provide the effect that: when an area of the diffusion bonding section of the piece of corrugated foil with the piece of flat foil is increased, a ratio of a portion in which two pairs of pieces of flat foil are bonded is increased, so that the rigidity of the piece of flat foil is increased, and as a result, the rigidity of the honeycomb body in the radial direction is increased and the honeycomb body can resist thermal stress in the radial direction generated in the drift current section on the entry side of exhaust gas. As shown in FIG. 7(b), the length of the trapezoidal section 14 on the entry side of exhaust gas is the same as that described above. The corrugation is a trapezoid in the region or section 14. Also, the corrugation is a normal shape in the region 15. It is preferable that the shape is smoothly changed from the trapezoid to the normal shape in a transition region between them.

Further, in the present invention, the thickness of the piece of flat foil on the entry side of exhaust gas is different from the thickness of the piece of flat foil on the delivery side of exhaust gas. It is preferable that the thickness of the piece of flat foil on the entry side of exhaust gas is not less than twice as large as the thickness of the piece of flat foil on the delivery side of exhaust gas. The reason is described as follows. In the same manner as that of an increase in the rigidity by improvement in the shape of the trapezoidal corrugation, when the thickness of the piece of flat foil on the entry side of exhaust gas is increased with respect to the thickness of the piece of flat foil on the delivery side of exhaust gas, the rigidity of the honeycomb body in the radial direction can be increased. The thickness of the piece of foil may be changed by a constant taper from the entry side of exhaust gas to the delivery side of exhaust gas, however, it is possible to adopt an arrangement in which the thickness is changed stepwise.

EXAMPLE

1. A catalyst carrier, the outer diameter of which is 100 mm, the length of which is 100 mm, was made of the following material, and a durability test was made.
Flat Foil:
Foil is made of 20Cr-5Al ferritic stainless steel, width is 100 mm, and surface is finished without orientation.
A piece of foil, the surface of which is finished without orientation, is rolled by finish rolling. Surface roughness of a piece of foil in direction L is the same as that in direction C.
Corrugated Foil:
The above piece of foil is corrugated.
Outer Cylinder:
Outer cylinder is composed of a heat-resistant stainless steel pipe made of 18Cr-8Ni, the wall thickness is 1.5 mm, the length is 100 mm, and the outer diameter is 102 mm.

Conventional Example 1

Thickness of pieces of flat foil and corrugated foil is 50 μm, and Ra is 0.40 μm.
Corrugation is a sine wave form.
Width of a contact portion of a piece of flat foil with a piece of corrugated foil is 10 μm.
While a piece of flat foil was being given a back tension of 10 kgf, it was wound together with a piece of corrugated foil, so that a metallic honeycomb, the outer diameter of which was 100 mm, was made. After solder was coated on an inner face of an outer cylinder, the outer cylinder was inserted into the metallic honeycomb body. Then, the metallic honeycomb body was heated to 1200° C. for 90 minutes in a vacuum of $10^{-2}$ Pa.

In this catalyst carrier, λb was 3.6 as shown in the following expression.

$$\lambda b = 6.8 \times 10^{-12} \times 1/(50 \times 10^{-6}) \times \sqrt{10}/\sqrt{(0.40 \times 10^{-6})} \times 4\sqrt{1473} \times \exp(15000/1473) \times \sqrt{(10 \times 10^{-6})} = 3.6$$

In this connection, $$7.52 \times 10^9 \times \exp(-35000/1473) = 0.36 \geq 8 \times 10^{-2}$$

Example 1 of the Present Invention

Thickness of pieces of flat foil and corrugated foil is 50 μm, and Ra is 0.18 μm.
Corrugation is a trapezoid.
Width of a contact portion of a piece of flat foil with a piece of corrugated foil is 100 μm.
While a piece of flat foil was being given a back tension of 10 kgf, it was wound together with a piece of corrugated foil, so that a metallic honeycomb, the outer diameter of which was 100 mm, was made. After solder was coated on an inner face of an outer cylinder, the outer cylinder was inserted into the metallic honeycomb body. Then, the metallic honeycomb body was heated to 1200° C. for 90 minutes in a vacuum of $10^{-2}$ Pa.

In this catalyst carrier, $\lambda b$ was 16.7 as shown in the following expression.

$$\lambda b = 6.8 \times 10^{-12} \times 1/(50 \times 10^{-6}) \times \sqrt{10}/\sqrt{(0.18 \times 10^{-6})} \times \sqrt[4]{1523 \times \exp(15000/1523)} \times \sqrt{(100 \times 10^{-6})} = 16.7$$

In this connection, $$7.52 \times 10^9 \times \exp(-35000/1523) = 0.36 \geqq 8 \times 10^{-2}$$

Example 2 of the Present Invention

Thickness of pieces of flat foil and corrugated foil is 20 μm, and Ra is 0.18 μm.

Corrugation is a sine wave form.

Width of a contact portion of a piece of flat foil with a piece of corrugated foil is 10 μm.

While a piece of flat foil was being given a back tension of 10 kgf, it was wound together with a piece of corrugated foil, so that a metallic honeycomb, the outer diameter of which was 100 mm, was made. After solder was coated on an inner face of an outer cylinder, the outer cylinder was inserted into the metallic honeycomb body. Then, the metallic honeycomb body was heated to 1200° C. for 90 minutes in a vacuum of $10^{-2}$ Pa.

In this catalyst carrier, $\lambda b$ was 8.4 as shown in the following expression.

$$\lambda b = 6.8 \times 10^{-12} \times 1/(20 \times 10^{-6}) \times \sqrt{2}/\sqrt{(0.18 \times 10^{-6})} \times \sqrt[4]{1473 \times \exp(15000/1473)} \times \sqrt{(10 \times 10^{-6})} = 8.4$$

In this connection,
$7.52 \times 10^9 \times \exp(-35000/1473) = 0.36 \geqq 8 \times 10^{-2}$ Example 3 of the Present Invention Thickness of pieces of flat foil and corrugated foil is 20 μm, and Ra is 0.18 μm.

Corrugation is a trapezoid.

Width of a contact portion of a piece of flat foil with a piece of corrugated foil is 100 μm.

While a piece of flat foil was being given a back tension of 10 kgf, it was wound together with a piece of corrugated foil, so that a metallic honeycomb, the outer diameter of which was 100 mm, was made. After solder was coated on an inner face of an outer cylinder, the outer cylinder was inserted into the metallic honeycomb body. Then, the metallic honeycomb body was heated to 1200° C. for 90 minutes in a vacuum of $10^{-2}$ Pa.

In this catalyst carrier, $\lambda b$ was 18.6 as shown in the following expression.

$$\lambda b = 6.8 \times 10^{-12} \times 1/(20 \times 10^{-6}) \times \sqrt{2}/\sqrt{(0.18 \times 10^{-6})} \times \sqrt[4]{1473 \times \exp(15000/1473)} \times \sqrt{(100 \times 10^{-6})} = 18.6$$

In this connection,
$7.52 \times 10^9 \times \exp(-35000/1473) = 0.36 \geqq 8 \times 10^{-2}$ Conventional Example 2

Thickness of pieces of flat foil and corrugated foil is 20 μm, and Ra is 0.40 μm.

Corrugation is a sine wave form.

Width of a contact portion of a piece of flat foil with a piece of corrugated foil is 10 μm.

While a piece of flat foil was being given a back tension of 2 kgf, it was wound together with a piece of corrugated foil, so that a metallic honeycomb, the outer diameter of which was 100 mm, was made. After solder was coated on an inner face of an outer cylinder, the outer cylinder was inserted into the metallic honeycomb body. Then, the metallic honeycomb body was heated to 1250° C. for 90 minutes in a vacuum of $10^{-2}$ Pa.

In this catalyst carrier, $\lambda b$ was 28.6 as shown in the following expression.

$$\lambda b = 6.8 \times 10^{-12} \times 1/(20 \times 10^{-6}) \times \sqrt{2}/\sqrt{(0.40 \times 10^{-6})} \times \sqrt[4]{1523 \times \exp(15000/1523)} \times \sqrt{(10 \times 10^{-6})} = 28.6$$

In this connection,
$7.52 \times 10^9 \times \exp(-35000/1523) = 0.75 \geqq 8 \times 10^{-2}$ 1. With respect to Conventional Examples 1 and 2 and Examples 1 to 3 of the present invention, a thermal durability test of engine was conducted, in which the temperature of gas on the entry side was 950° C. and it was turned on for 10 minutes and turned off for 10 minutes, which was determined to be one cycle. The results of evaluation are shown on Table 2.

TABLE 2

Comparison between performance of conventional example and that of example of the present invention

|  | | Result of thermal test of engine | Success or failure | |
| --- | --- | --- | --- | --- |
|  | $\lambda b$ | (cycle) | 900 cycles | 1800 cycles |
| Conventional example 1 | 3.6 | 410 | Failure | Failure |
| Example 1 of the present invention | 16.7 | 2180 | Success | Success |
| Example 2 of the present invention | 8.4 | 1050 | Success | Failure |
| Example 3 of the present invention | 18.6 | 1530 | Success | Failure |
| Conventional example 2 | 28.6 | 440 | Failure | Failure |

According to the results of the above experiments, the following can be concluded. The present invention can provide a diffusion bonded metallic catalyst carrier, comprising: a honeycomb body composed of a piece of plane foil made of heat-resistant stainless steel containing aluminum and a piece of corrugated foil made of stainless steel, the piece of corrugated foil and the piece of flat foil being alternately wound; and an outer cylinder made of metal into which the honeycomb body is incorporated, the honeycomb body and the outer cylinder being integrated into one body by means of diffusion bonding, the diffusion bonded metallic catalyst carrier being manufactured in a condition so that $\lambda b$, which is defined by $$\lambda b = 6.8 \times 10^{-12} \times \delta f^{-1} \times F^{1/2} \times Ra^{-1/2} \times T^{1/4} \exp(15000/T) \times b^{1/2},$$

can be in a range from 8 to 20 where thickness of the strip of foil is $\delta f$ (m), average roughness of the foil surface in the width direction is Ra (m), back tension in the case of winding is F (kgf), contact width of the piece of flat foil with the piece of corrugated foil is b (m), heat treatment temperature is T (K), and degree of vacuum is Pout (Pa). In this case, $7.52 \times 10^9 \times \exp(-35000/T) \geqq 8 \times \text{Pout}$ is satisfied.

When the diffusion bonded metallic catalyst carrier is manufactured as described above, it is possible to ensure a quantity of vaporized aluminum necessary for diffusion bonding, so that the mechanical strength of the diffusion bonded joint can be guaranteed. When a quantity of vaporized aluminum is minimized, the resistance to oxidation can be maximized. In this way, it is possible to provide a high quality of diffusion bonded metallic catalyst carrier.

2. A catalyst carrier, the outer diameter of which is 100 mm and the length of which is 100 mm, was made of the following material, and a durability test was made.

Flat Foil:
Foil is made of 20Cr-5Al ferritic stainless steel, and width is 100 mm.

Corrugated Foil:
The above piece of foil is corrugated.

Outer Cylinder:
Outer cylinder is composed of a heat-resistant stainless steel pipe made of 18Cr-8Ni, the wall the thickness is 1.5 mm, the length is 100 mm, and the outer diameter is 102 mm.

Conventional Example 3

Thickness of pieces of flat foil and corrugated foil is 50 μm, and Ra is 0.35 μm.

Corrugation is a sine wave form.

Width of a contact portion of a piece of flat foil with a piece of corrugated foil is 10 μm.

While a piece of flat foil was being given a back tension of 10 kgf, it was wound together with a piece of corrugated foil, so that a metallic honeycomb, the outer diameter of which was 100 mm, was made. After solder was coated on an inner face of an outer cylinder, the outer cylinder was inserted into the metallic honeycomb body. Then, the metallic honeycomb body was heated to 1200° C. for 90 minutes in a vacuum of $10^{-2}$ Pa.

In this catalyst carrier, $\lambda b$ was 3.8 as shown in the following expression.

$$\lambda^b = 6.8 \times 10^{-12} \times 1/(50 \times 10^{-6}) \times \sqrt{10}/\sqrt{(0.35 \times 10^{-6})} \times \sqrt[4]{1473} \times \exp(15000/1473) \times \sqrt{(10 \times 10^{-6})} = 3.8$$

In this connection,
$7.52 \times 10^9 \times \exp(-35000/1473) = 0.36 \geq 8 \times 10^{-2}$ is satisfied.

Example 4 of the Present Invention

Thickness of pieces of flat foil and corrugated foil is 50 μm, and Ra is 0.15 μm.

Corrugation is a trapezoid.

Width of a contact portion of a piece of flat foil with a piece of corrugated foil is 100 μm.

While a piece of flat foil was being given a back tension of 10 kgf, it was wound together with a piece of corrugated foil, so that a metallic honeycomb, the outer diameter of which was 100 mm, was made. After solder was coated on an inner face of an outer cylinder, the outer cylinder was inserted into the metallic honeycomb body. Then, the metallic honeycomb body was heated to 1200° C. for 90 minutes in a vacuum of $10^{-2}$ Pa.

In this catalyst carrier, $\lambda b$ was 18.0 as shown in the following expression.

$$\lambda b = 6.8 \times 10^{-12} \times 1/(50 \times 10^{-6}) \times \sqrt{10}/\sqrt{(0.15 \times 10^{-6})} \times \sqrt[4]{1473} \times \exp(15000/1473) \times \sqrt{(100 \times 10^{-6})} = 18.0$$

In this connection,
$7.52 \times 10^9 \times \exp(-35000/1473) = 0.36 \geq 8 \times 10^{-2}$ is satisfied.

Example 5 of the Present Invention

Thickness of pieces of flat foil and corrugated foil is 20 μm, and Ra is 0.15 μm.

Corrugated is a sine wave form.

Width of a contact portion of a piece of flat foil with a piece of corrugated foil is 10 μm.

While a piece of flat foil was being given a back tension of 10 kgf, it was wound together with a piece of corrugated foil, so that a metallic honeycomb, the outer diameter of which was 100 mm, was made. After solder was coated on an inner face of an outer cylinder, the outer cylinder was inserted into the metallic honeycomb body. Then, the metallic honeycomb body was heated to 1200° C. for 90 minutes in a vacuum of $10^{-2}$ Pa.

In this catalyst carrier, $\lambda b$ was 9.0 as shown in the following expression.

$$\lambda b = 6.8 \times 10^{-12} \times 1/(20 \times 10^{-6}) \times \sqrt{2}/\sqrt{(0.15 \times 10^{-6})} \times \sqrt[4]{1473} \times \exp(15000/1473) \times \sqrt{(10 \times 10^{-6})} = 9.0$$

In this connection,
$7.52 \times 10^9 \times \exp(-35000/1473) = 0.36 \geq 8 \times 10^{-2}$ is satisfied.

Example 6 of the Present Invention

Thickness of pieces of flat foil and corrugated foil is 20 μm, and Ra is 0.15 μm.

Corrugation is a trapezoid.

Width of a contact portion of a piece of flat foil with a piece of corrugated foil is 100 μm.

While a piece of flat foil was being given a back tension of 10 kgf, it was wound together with a piece of corrugated foil, so that a metallic honeycomb, the outer diameter of which was 100 mm, was made. After solder was coated on an inner face of an outer cylinder, the outer cylinder was inserted into the metallic honeycomb body. Then, the metallic honeycomb body was heated to 1200° C. for 90 minutes in a vacuum of $10^{-2}$ Pa.

In this catalyst carrier, $\lambda b$ was 20.0 as shown in the following expression.

$$\lambda b = 6.8 \times 10^{-12} \times 1/(20 \times 10^{-6}) \times \sqrt{2}/\sqrt{(0.15 \times 10^{-6})} \times \sqrt[4]{1473} \times \exp(15000/1473) \times \sqrt{(100 \times 10^{-6})} = 20.0$$

In this connection,
$7.52 \times 10^9 \times \exp(-35000/1473) = 0.36 \geq 8 \times 10^{-2}$ is satisfied.

Conventional Example 4

Thickness of pieces of flat foil and corrugated foil is 20 μm, and Ra is 0.35 μm.

Corrugation is a sine wave form.

Width of a contact portion of a piece of flat foil with a piece of corrugated foil is 10 μm.

While a piece of flat foil was being given back tension of 2 kgf, it was wound together with a piece of corrugated foil, so that a metallic honeycomb, the outer diameter of which was 100 mm, was made. After solder was coated on an inner face of an outer cylinder, the outer cylinder was inserted into the metallic honeycomb body. Then, the metallic honeycomb body was heated to 1250° C. for 90 minutes in a vacuum of $10^{-2}$ Pa.

In this catalyst carrier, $\lambda b$ was 30.5 as shown in the following expression.

$$\lambda b = 6.8 \times 10^{-12} \times 1/(20 \times 10^{-6}) \times \sqrt{2}/\sqrt{(0.35 \times 10^{-6})} \times \sqrt[4]{1523} \times \exp(15000/1523) \times \sqrt{(10 \times 10^{-6})} = 30.5$$

In this connection,
$7.52 \times 10^9 \times \exp(-35000/1523) = 0.75 \geq 8 \times 10^{-2}$ is satisfied.

Figure 1:
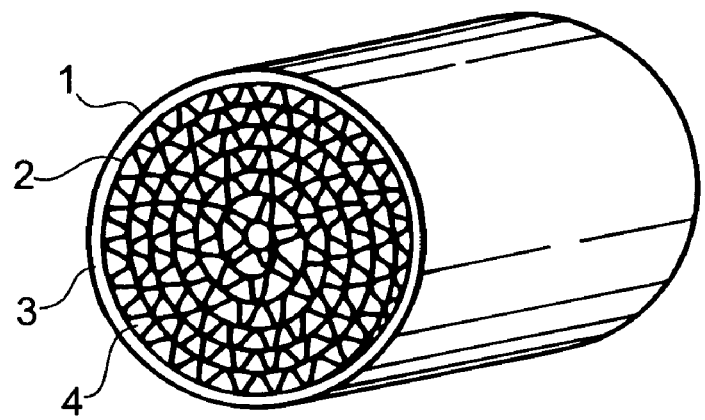
FIG. 1 is a perspective view showing an appearance of a catalyst carrier.
Figure 2:
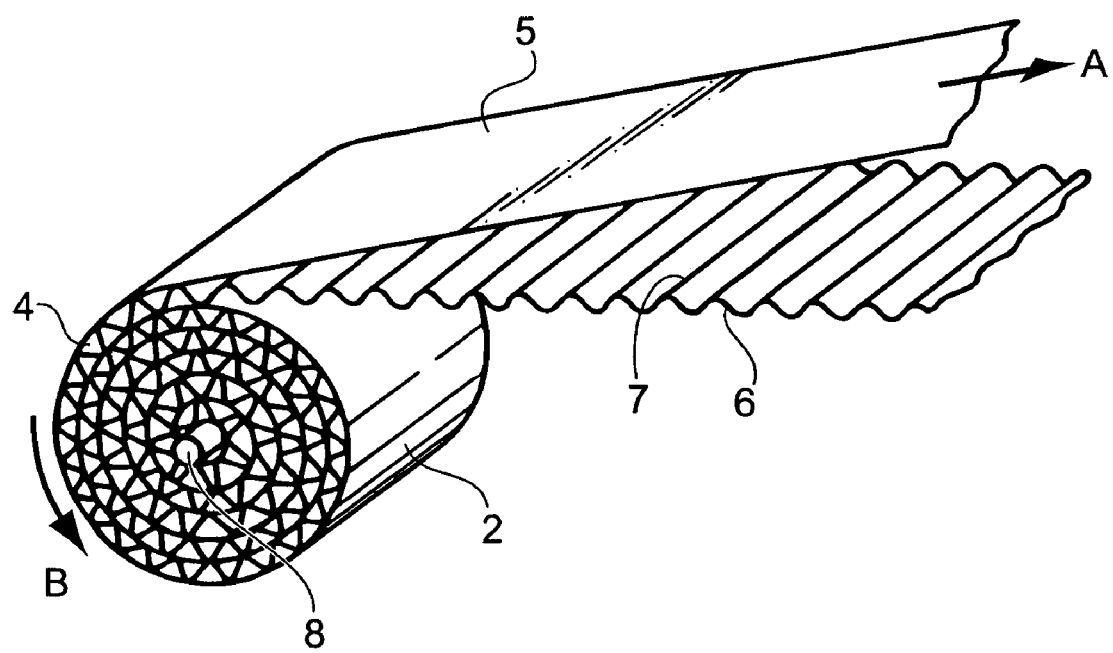
FIG. 2 is a perspective view showing a method of manufacturing a metallic honeycomb body.
Figure 3:
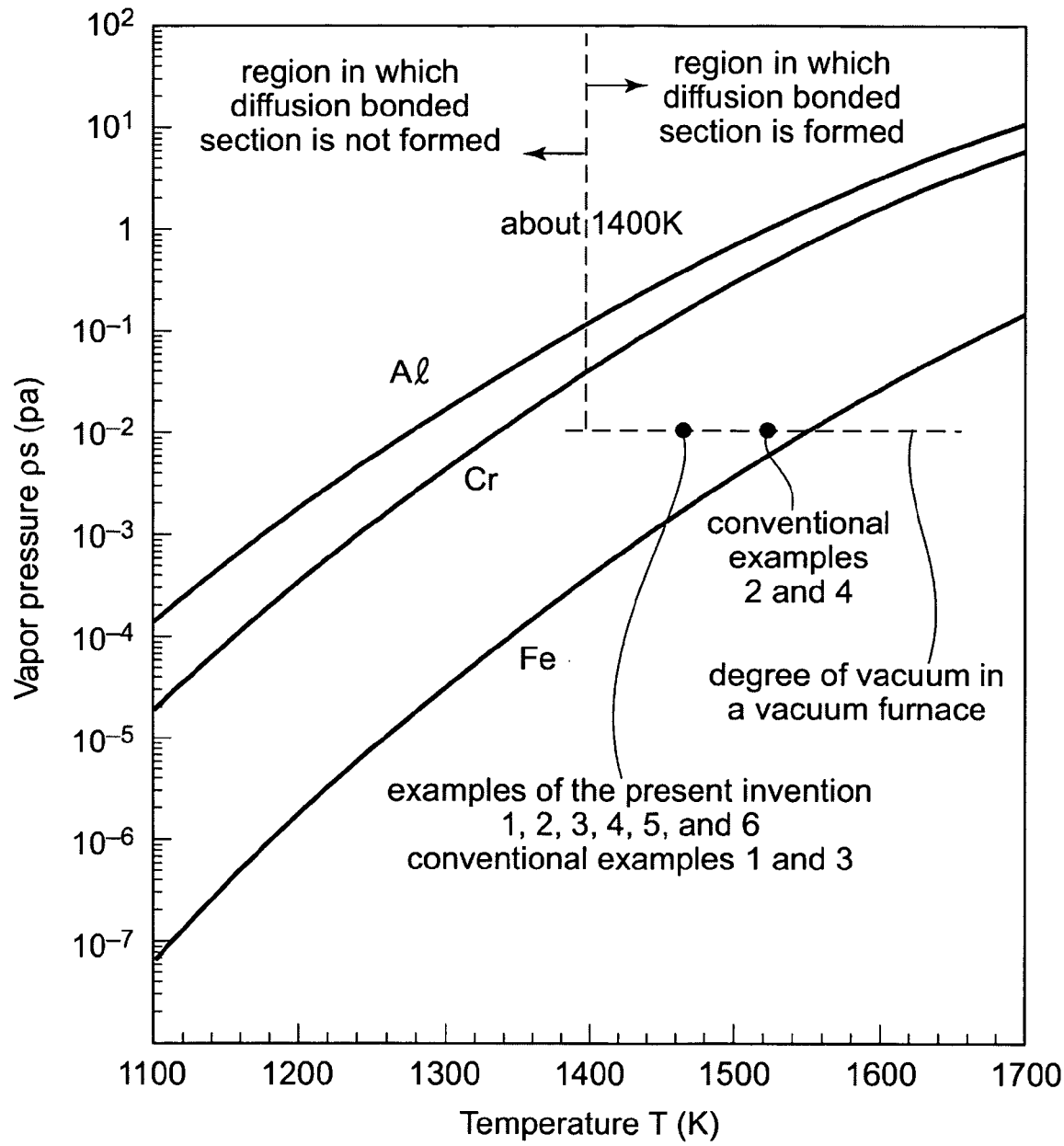
FIG. 3 is a diagram showing the temperature dependency of the vapor pressure of iron, of aluminum and of chromium.

In this connection, FIG. 3 is a graph on which the degree of vacuum and the temperature of diffusion bonding in a vacuum furnace are plotted.

With respect to Conventional Examples 1 and 2 and Examples 1 to 3 of the present invention, a thermal durability test of engine was conducted, in which the temperature of entry gas was 950° C. and it was turned on for 10 minutes and turned off for 10 minutes, which was determined to be one cycle. The results of evaluation are shown on Table 2.

TABLE 3

Comparison between performance of conventional example and that of example of the present invention

| | $\lambda b$ | Result of thermal test of engine (cycle) | Success or failure 900 cycles | 1800 cycles |
|---|---|---|---|---|
| Conventional example 3 | 3.8 | 454 | Failure | Failure |
| Example 4 of the present invention | 18.0 | 2000 | Success | Success |
| Example 5 of the present invention | 9.0 | 1100 | Success | Failure |
| Example 6 of the present invention | 20.0 | 1130 | Success | Failure |
| Conventional example 4 | 30.5 | 414 | Failure | Failure |

According to the results of the above experiments, the following can be concluded. The present invention can provide a diffusion bonded metallic catalyst carrier, comprising: a honeycomb body composed of a piece of flat foil made of heat-resistant stainless steel containing aluminum and a piece of corrugated foil made of stainless steel, the piece of corrugated foil and the piece of flat foil being alternately wound; and an outer cylinder made of metal into which the honeycomb body is incorporated, the honeycomb body and the outer cylinder being integrated into one body by means of diffusion bonding, the diffusion bonded metallic catalyst carrier being manufactured in a condition so that $\lambda b$, which is defined by $$\lambda b = 6.8 \times 10^{-12} \times \delta f^{-1} \times F^{1/2} \times Rac^{-1/2} \times T^{1/4} \times \exp(15000/T) \times b^{1/2},$$

can be in a range from 8 to 20 where thickness of the strip of foil is $\delta f$ (m), average roughness of the foil surface in the width direction is Ra (m), back tension in the case of winding is F (kgf), contact width of the piece of flat foil with the piece of corrugated foil is b (m), heat treatment temperature is T (K), and degree of vacuum is Pout (Pa). When the diffusion bonded metallic catalyst carrier is manufactured as described above, it is possible to ensure a quantity of vaporized aluminum necessary for diffusion bonding, so that the mechanical strength of the diffusion bonded joint can be guaranteed. When a quantity of vaporized aluminum is minimized, the resistance to oxidation can be maximized. In this way, it is possible to provide a high quality diffusion bonded metallic catalyst carrier.

In this case, a proportion constant C is determined to be $C=6.8\times10^{-12}$. That is, it is determined that $C=6.8\times10^{-12}$ when the thermal durability test of an engine is conducted wherein one cycle is set in such a manner that the catalyst carrier is turned on for 10 minutes and turned off of 10 minutes at the entry gas temperature of 950° C. When the test condition is changed, C is also changed. Therefore, C can be found as a dependent variable of the condition of the thermal durability test of an engine by experiments.

Example 7 of the Present Invention

In this example, pieces of flat foil and corrugated foil were made of stainless steel containing aluminum at 5 weight %. In Examples 1 and 2 of the present invention and also in Comparative Example, thickness T of pieces of foil is 30 µm. In Example 3 of the present invention, thickness of a piece of flat foil on the entry side of exhaust gas is 60 µm and thickness of a piece of flat foil on the delivery side of exhaust gas is 30 µm, and thickness is linearly changed. Thickness of a piece of corrugated foil is uniformly 30 µm.

In Examples 1 and 2 of the present invention and also in Comparative Example, the configuration of a piece of corrugation-form was a sine wave, and the height of a wave was 1.25 mm and the pitch of a wave was 2.5 mm. In Example 2 of the present invention, the corrugation on the entry side of exhaust gas was a trapezoid, the corrugation on the delivery side of exhaust gas was a sine wave, the length of a trapezoidal portion was 20 mm, and a configuration of the transition portion between the trapezoid and the sine waveform is gradually changed. The height of the wave was 1.25 mm, the pitch was 2.5 mm, and width W of the contact portion of the piece of flat foil with the piece of corrugated foil was 0.3 mm. A configuration of the corrugation of the piece of corrugated foil can be changed by changing a configuration of a die used for making the piece of corrugated foil when the piece of flat foil is corrugated.

The thus corrugated piece of corrugated foil and the piece of flat foil were wound so that a honeycomb body, the diameter of which was 88 mm and the length of which was 120 mm, was made. This honeycomb body was inserted into an outer cylinder made of stainless steel, the inner diameter of which was 87 mm, the thickness of which was 1.5 mm and the length of which was 125 mm. In this way, a metallic support was made.

In Example 1 of the present invention, before the pieces of flat foil and corrugated foil were wound, portions on both sides of the piece of flat foil on the entry side of exhaust gas, the width of which was 20 mm, were coated with adhesive. After that, the pieces of flat foil and corrugated foil were wound and press-fitted into the outer cylinder, so that the catalyst carrier was made. Before the coated adhesive was dried, powder of solder was scattered in a range from a gas passage of the catalyst carrier to the inside of the catalyst carrier. Due to the foregoing, powder of solder was made to adhere to the portion coated with adhesive. Under the above condition, the catalyst carrier was put into a vacuum treatment furnace so as to conduct diffusion bonding. In the furnace, the catalyst carrier was heated to 1150° C. and kept at the temperature for 60 minutes. In this way, diffusion bonding was carried out. When the catalyst carrier was heated to high temperature as described above, powder of solder was melted and solidified after the completion of vacuum treatment. In this way, the soldered section was completed. In Examples 2 and 3 of the present invention and also in Comparative Example, vacuum treatment was carried out in the same manner as that of Example 1 of the present invention, and all joined portions of the catalyst carrier were subjected to diffusion bonding.

The thus manufactured catalyst carrier was arranged right after the exhaust manifold of a gasoline engine of 4 cylinders, and a thermal repetition test of 900° C.×20 minutes→150° C.×30 minutes was conducted for 600 cycles, and damage of the catalyst carrier was investigated. As a result of the investigation, a defect was found in one portion of the catalyst carrier on the entry side of exhaust gas in Comparative Example, however, no defects were found in the catalyst carrier of Examples of the present invention.

INDUSTRIAL POSSIBILITY

According to the present invention, it is possible to propose a manufacturing condition by which the bond strength of diffusion bonded joint and the resistance to oxidation can be made to be compatible with each other. Therefore, when a diffusion bonded metallic catalyst carrier is manufactured according to the condition proposed by the present invention, it is possible to manufacture a high quality diffusion bonded metallic catalyst carrier.

According to the present invention, the rigidity of a piece of foil on the entry side of exhaust gas of the catalyst carrier is high. Therefore, even if a drift current of exhaust gas exists, there is no possibility of damage to the catalyst carrier. On the delivery side of exhaust gas, diffusion bonding is conducted by the most appropriate foil thickness and the most appropriate foil configuration. Accordingly, advantages of the diffusion bonded metallic catalyst carrier can be fully utilized.

What is claimed is:

1. A diffusion bonded metallic catalyst carrier comprising: a honeycomb body comprising a piece of corrugated foil made of heat-resistant stainless steel containing aluminum and a piece of flat foil made of stainless steel, the piece of corrugated foil and the piece of flat foil alternately wound or laminated on each other; and an outer cylinder made of metal with the honeycomb body located in the outer cylinder and bonded thereto, and wherein the piece of corrugated foil is bonded to the piece of flat foil by diffusion bonding conducted by heat treatment in a vacuum, wherein exhaust gas channels extend from an exhaust gas entry side to an exhaust gas delivery side of the metallic catalyst carrier honeycomb body in a direction perpendicular to the rolling direction of the corrugated foil and the flat foil;

wherein the pieces of foil have a surface roughness in a width direction of the foil after said diffusion bonding conducted by heat treatment in a vacuum wherein an arithmetical mean deviation of asserted profile Ra after diffusion bonding conducted by heat treatment in a vacuum is 0.001 to 2.0 μm, diffusion bonds formed by said diffusion bonding provide joint sections between two pieces of foil of the corrugated foil and the flat foil with no sintered bridges formed at both end portions of the joint sections in the longitudinal direction of the pieces of foil, solder bonds are located at contact portions of the piece of flat foil and the piece of corrugated foil at the exhaust gas entry side; and diffusion bonds are located at the contact portions of the piece of flat foil and the piece of corrugated foil at the exhaust gas delivery side.

2. A diffusion bonded metallic catalyst carrier according to claim 1, wherein the piece of corrugated foil at the exhaust gas entry side of the catalyst carrier has a wave form in a trapezoid shape and area of contact between the piece of flat foil and the trapezoid shape wave form of the piece of corrugated foil at the exhaust gas entry side is large, and the piece of corrugated foil at the exhaust gas delivery side of the catalyst carrier has a wave form configuration wherein area of contact between the piece of flat foil and the configuration of the wave form of the piece of corrugated foil at the exhaust gas delivery side is not large.

3. A diffusion bonded metallic catalyst carrier according to claim 1, wherein the piece of flat foil has a thickness which is not uniform, wherein the thickness of the piece of flat foil at the exhaust gas entry side of the catalyst carrier is large and the thickness of the piece of flat foil at exhaust gas delivery side of the catalyst carrier is small.

4. A diffusion bonded metallic catalyst carrier comprising: a honeycomb body comprising a piece of corrugated foil made of heat-resistant stainless steel containing aluminum and a piece of flat foil or corrugated foil made of stainless steel, the piece of corrugated foil and the piece of flat foil or corrugated foil alternately wound or laminated on each other; and an outer cylinder made of metal with the honeycomb body located in the outer cylinder and bonded thereto, and wherein the piece of corrugated foil is bonded to the piece of flat foil or corrugated foil by diffusion bonding conducted by heat treatment in a vacuum, wherein the pieces of foil have a surface roughness in a width direction of the foil after diffusion bonding conducted by heat treatment in a vacuum wherein an arithmetical mean deviation of asserted profile Ra after diffusion bonding conducted by heat treatment in a vacuum is 0.001 to 2.0 μm, and diffusion bonds formed by said diffusion bonding provide joint sections between two pieces of foil of the corrugated foil and the flat foil or the corrugated foil with no sintered bridges formed at both end portions of the joint sections in the longitudinal direction of the pieces of foil;

wherein the catalyst carrier has an exhaust gas entry side and an exhaust gas delivery side, solder bonds are located at contact portions of the piece of corrugated foil and the piece of flat foil or corrugated foil at the exhaust gas entry side; and diffusion bonds are located at the contact portions of the piece of corrugated foil and the piece of flat foil or corrugated foil at the exhaust gas delivery side.

5. A diffusion bonded metallic catalyst carrier according to claim 4, wherein the honeycomb body comprises the piece of corrugated foil and the piece of flat foil; and wherein the piece of corrugated foil at the exhaust gas entry side of the catalyst carrier has a wave form in a trapezoid shape and area of contact between the piece of flat foil and the trapezoid shape wave form of the piece of corrugated foil at the exhaust gas entry side is large, and the piece of corrugated foil at the exhaust gas delivery side of the catalyst carrier has a wave form configuration wherein area of contact between the piece of flat foil and the configuration of the wave form of the piece of corrugated foil at the exhaust gas delivery side is not large.

6. A diffusion bonded metallic catalyst carrier according to claim 4, wherein the honeycomb body comprises the piece of corrugated foil and the piece of flat foil; and wherein the piece of flat foil has a thickness which is not uniform, wherein the thickness of the piece of flat foil at the exhaust gas entry side of the catalyst carrier is large and the thickness of the piece of flat foil at exhaust gas delivery side of the catalyst carrier is small.

7. A diffusion bonded metallic catalyst carrier according to claim 1, wherein the honeycomb body is solder bonded to the outer cylinder.

8. A diffusion bonded metallic catalyst carrier according to claim 4, wherein the honeycomb body is solder bonded to the outer cylinder.

* * * * *